Sept. 2, 1947.                L. J. SIVIAN                2,426,650
           METHOD OF SOLDERING A TERMINAL TO A PIEZOELECTRIC CRYSTAL
                              Filed Dec. 27, 1943

INVENTOR
L. J. SIVIAN
BY
E. V. Griggs
ATTORNEY

Patented Sept. 2, 1947

2,426,650

UNITED STATES PATENT OFFICE 2,426,650

METHOD OF SOLDERING A TERMINAL TO A PIEZOELECTRIC CRYSTAL

Leon J. Sivian, Summit, N. J., assignor to Bell Telephone Laboratories, Incorporated, New York, N. Y., a corporation of New York Application December 27, 1943, Serial No. 515,759

3 Claims. (Cl. 113—112)

This invention relates to joining metallic surfaces by soldering or surface alloying and more particularly to methods of soldering or surface alloying in which the work is subjected to ultrasonic vibrations during the process.

An object of the invention is to so prepare the surface layer of a difficultly solderable metal, e. g. aluminum, as to render subsequent soldering easy and to minimize the heating required in the soldering operation.

Another object of the invention is to improve the bond between parts soldered together.

Another object of the invention is to improve the bond between solder and such difficultly solderable metals as platinum and aluminum.

An additional object of the invention is to eliminate the necessity of using resin or other flux in soldering to such materials as platinum and aluminum.

In accordance with the invention a piece of solder is fused on the surface of the difficultly solderable metal, the metal being maintained in ultrasonic vibration in any desired manner. Thereafter, excessive solder may be wiped off leaving an alloy spot of different color in the region to which the solder was applied. The other part to be joined after previous tinning may be brought into contact with the alloy spot and readily joined thereto by application of heat.

Figure 1:
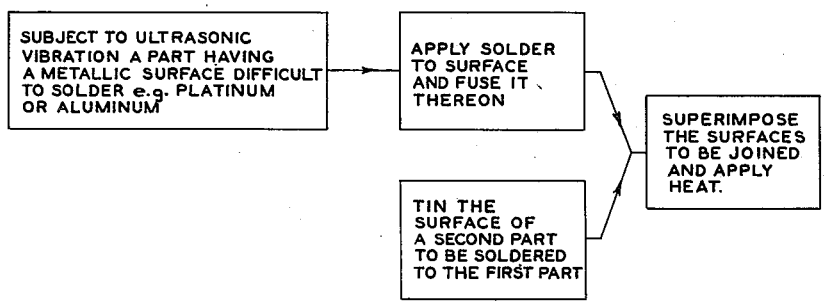
Figure 2:
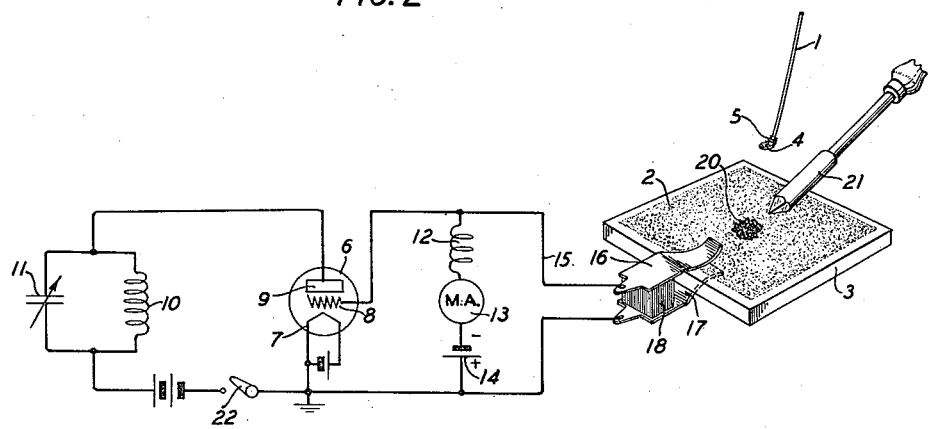

For a clearer understanding of the nature of the invention and its various features and objects reference may be had to the following description taken in connection with the accompanying drawing in which Fig. 1 illustrates diagrammatically one form which the method of the invention may take and Fig. 2 shows one type of apparatus for effecting the method of the invention.

The soldering of certain metallic surfaces is attended with considerable difficulty because of the nature of the metal. In many instances also the shape or thickness of the body, the surface of which is to be soldered may add to this difficulty. Sometimes, too, it may be undesirable to apply resin or other acid fluxes which are commonly used to facilitate soldering or surface alloying. It may also be desirable to reduce the heating required by the soldering operation as, e. g., when the metal constitutes the coating of a crystal which tends to crack.

According to this invention, as portrayed in Fig. 1, a part having a surface difficult to be soldered may be set in ultrasonic vibration and solder may be applied to and fused on the surface of the part which is to be joined. Thereafter the second part to be joined, previously tinned, is placed with its surface in contact with the fused solder and the surface of the first part and heat is applied. This enables the proper union to occur without application of flux. When two difficultly solderable materials are to be joined it will be advantageous to give each the preparation which has been described. As an instance, if an aluminum lead wire is to be soldered to an aluminum sheet such as a coating on a piezoelectric crystal both the lead wire and the sheet should be subjected to ultrasonic vibrations while in contact with molten solder.

Fig. 2 illustrates apparatus for performing the method of the invention in the case of soldering a copper lead 1 to the thin platinum or aluminum electrode 2 of a piezoelectric crystal 3. The lead 1 has a flat terminal or foot portion 4 which is tinned as indicated at 5 to facilitate surface alloying with the solder and the electrode coating 2 with which it is to be joined. The coating 2 is in general very thin and may, for example, comprise a thin layer of aluminum deposited by evaporation which may be of the order of .0001 inch. In order to subject the aluminum surface 2 to ultrasonic vibration any appropriate high frequency vibrator may be employed. For the particular task outlined a vacuum tube oscillator is very convenient and is illustrated in the drawing. The oscillator may conveniently include the piezoelectric element 3 as a portion of its circuit in such manner as to apply an ultrasonic frequency electromotive force to the element 3 and to consequently subject it to ultrasonic vibrations.

As illustrated, the oscillator includes an electron discharge device which is shown as a conventional triode with the usual cathode 7, impedance control element 8 and anode 9. Between the terminals of the cathode and the anode is connected a tunable circuit comprising inductance 10 and variable condenser 11. Between the cathode and the impedance control element are connected a bias path including choke coil 12, milliammeter 13 and a biasing source 14 and an alternating current path 15 leading by way of the pair of spring clips 16 and 17 to the metal electrode 2 of the piezoelectric element with which the circuit electrodes are in electrically conductive engagement. The spring clips are held in relatively fixed position with respect to each other by an insulating connector 18 to which they are attached.

In operation a piezoelectric element 3 having a coating 2 to which a lead wire 1 is to be soldered is slipped into position between the spring clips 16, 17 so as to be supported thereby and also to enable the clips 16 and 17 to make electrical contact with the respective coatings 2. The element 3 will have one or more natural resonance frequencies in which it may be set in vibration by a corresponding frequency electromotive force applied between the spring clips 16 and 17. If, therefore, the tuned circuit 10, 11 be set at approximately one of these resonance frequencies, the thermionic oscillator as a whole will generate oscillations of the desired frequency and apply them to the electrodes 2 of piezoelectric element to cause the piezoelectric element to be set into mechanical vibration at the same frequency. In one example in actual practice, the vibration frequency was approximately 1750 kilocycles. The condition of oscillation may be readily determined by observation of the magnitude of the grid current traversing the milliammeter indicator 13. If oscillations do not take place the condenser 11 may be varied to change the resonance frequency of the tuned circuit to such an extent that oscillations will start. With the element 3 undergoing vibration a blob 20 of solder or of a low melting point material such as Wood's metal may be positioned near the center of an electrode 2 at the point where the connection is to be made by means of a soldering iron 21 of well-known type, which serves to maintain the solder fused after its engagement with the electrode 2. Care should be taken to minimize the heating of the crystal because of its attending danger of cracking. The soldering iron 21 may be withdrawn as soon as possible and it will be found that the globule of molten solder has spread over a considerably larger area than that which it originally occupied. A circuit closer 22 in the plate circuit of the oscillator may be opened to cut off the oscillations. The excess of solder or Wood's metal may be wiped off with a cloth within a second or two after stopping the vibrations and it will be apparent that the spot in which the Wood's metal or solder is soldered to or alloyed with the coating is different in appearance from the rest of the coating. In the case of platinum, for example, the color is markedly different and the spot is only a few tenths of a mil thick. To this alloy spot the copper lead 1 tinned with Wood's metal can now be easily attached by the application of heat alone. The resulting joint is so strong as not to break without pulling some of the platinum coating off the crystal along with it.

Although the operation has been described as involving setting the crystal into vibration prior to application of the solder or Wood's metal in the manner illustrated by the diagram of Fig. 1, in practice it has been found expedient to apply the solder while the crystal is still quiescent in its position between the spring clips 16 and 17 and thereafter to apply the electrical oscillations by closing the previously open circuit closer 22. This would involve changing the diagram of Fig. 1 so as to interchange the position of the first two blocks. Application of the piezoelectric drive for a few seconds is sufficient.

The theory of the operation is not fully understood but the spreading of the globule of molten solder or Wood's metal under the influence of the high frequency vibrations appears to have the effect of increasing the area of the electrode 2 to which heat is applied thus counteracting the surface tension effect which normally causes the molten material to make contact with the coating 2 over a very limited area. Possibly, also, the high frequency vibration tends to displace particles of air at the surface plane separating the electrode 2 from the solder and to cause minute particles of the solder to be impelled into more intimate engagement with any cavities or non-uniformities of the electrode surface.

Although the invention has been disclosed in connection with the operation of soldering leads to the electrodes of a piezoelectric crystal element it may be employed for various other soldering or surface alloying purposes, proper attention being given to the vibration frequency and the power of the vibrating source. In the case of a small article it would be feasible to utilize the piezoelectric element 3 as a support upon which the article to be soldered may rest so as to be set in vibration by the supporting device 3. However, ultrasonic vibrations may be applied by any source of mechanical vibrations whether of electrical character or not and the frequency of these vibrations may fall within a wide range depending upon the volume and mass of the article or object upon which the work is to be performed. Moreover the method of the invention is applicable to other difficultly solderable metals than those mentioned as, e. g., tantalum. In general, the higher the frequency that is feasible the more practicable it is to obtain greater concentrations of vibrational energy and the more widely will the alloy spot extend and the better the resulting contact. Also for a given energy density the greater the acceleration and there is reason to believe that this aids interspersion of the metals.

What is claimed is:

1. The method of joining terminals by soldering to the thin conductive coating of a piezoelectric crystal which comprises temporarily utilizing the coated crystal as a portion of a thermionic supersonic frequency oscillator whereby the crystal and its coating undergo supersonic vibrations and applying a blob of melted solder to a point on the crystal coating at which the terminal is to be soldered while the crystal remains in vibration whereby a strong bond over a relatively large area is formed between the solder and the crystal coating.

2. The method of claim 1 characterized in this that the lead to be soldered is brought into contact with the blob of solder on the crystal while the solder is in fluid form.

3. The method of claim 1 characterized in this that a lead wire to be soldered is brought into contact with the blob of solder adhering to the crystal while the solder is in fluid form and is undergoing supersonic vibration relative to the lead wire.

LEON J. SIVIAN.

REFERENCES CITED

The following references are of record in the file of this patent:

UNITED STATES PATENTS

| Number    | Name     | Date           |
|-----------|----------|----------------|
| 1,848,630 | Hulburt  | Mar. 8, 1932   |
| 1,817,181 | Eberhard | Aug. 4, 1931   |
| 2,139,469 | Sachse   | Dec. 6, 1938   |
| 2,308,606 | Ingerson | Jan. 19, 1943  |
| 2,222,906 | Hentzen  | Nov. 26, 1940  |
| 2,053,417 | Brace    | Sept. 8, 1936  |
| 1,939,712 | Mahoux   | Dec. 19, 1933  |
| 1,858,339 | Ohl      | May 17, 1932   |
| 2,397,400 | Barwich  | Mar. 26, 1946  |

FOREIGN PATENTS

| Number  | Country       | Date          |
|---------|---------------|---------------|
| 180,787 | Great Britain | Dec. 14, 1921 |
| 706,438 | Germany       | May 27, 1941  |
| 720,629 | Germany       | May 1942      |

OTHER REFERENCES

Ser. No. 276,257, Barwich (A. P. C.), published May 11, 1943.